Jan. 3, 1967   C. G. SEWELL   3,295,758
GRADE AVERAGING DEVICE
Filed Sept. 7, 1965   3 Sheets-Sheet 1

Cyrus G. Sewell
INVENTOR.

BY *Clarence A. O'Brien*
*and Harvey B. Jacobson*
Attorneys

Jan. 3, 1967 C. G. SEWELL 3,295,758
GRADE AVERAGING DEVICE
Filed Sept. 7, 1965 3 Sheets-Sheet 2
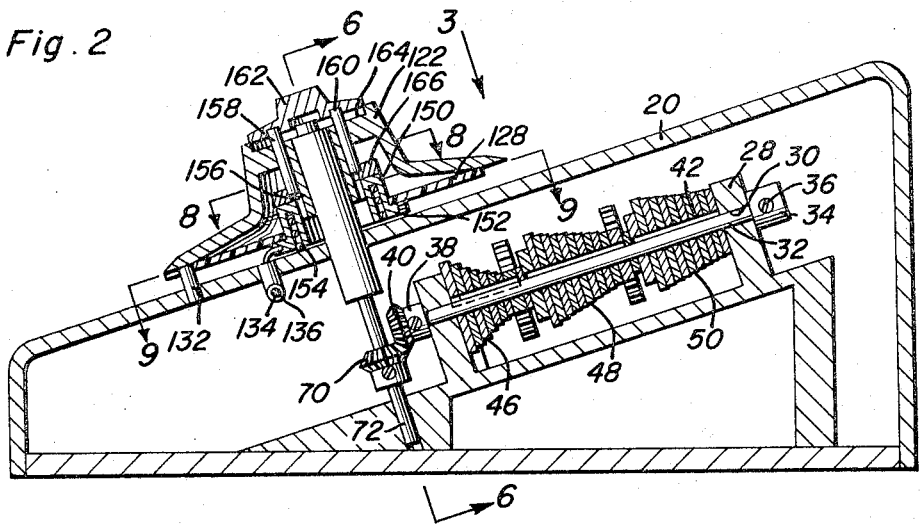
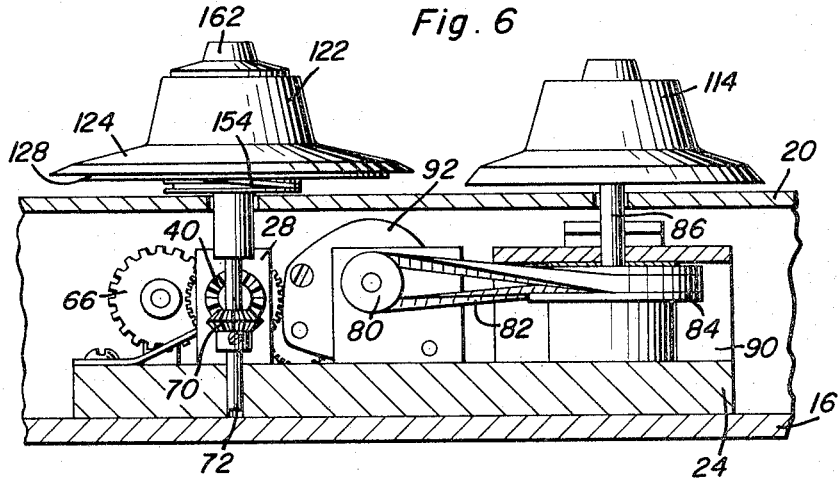
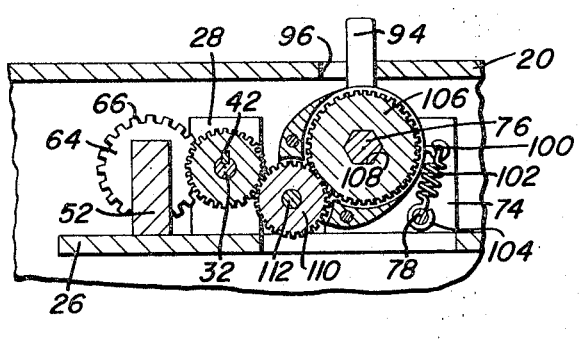
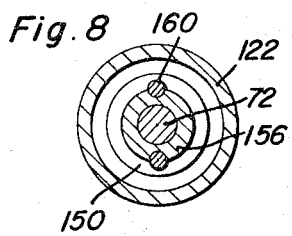
Cyrus G. Sewell
INVENTOR.

Jan. 3, 1967  C. G. SEWELL  3,295,758

GRADE AVERAGING DEVICE

Filed Sept. 7, 1965  3 Sheets-Sheet 3

Cyrus G. Sewell
INVENTOR.

BY *Clarence A. O'Brien*
*and Harvey B. Jacobson*
Attorneys

United States Patent Office 3,295,758
Patented Jan. 3, 1967

3,295,758
GRADE AVERAGING DEVICE
Cyrus G. Sewell, P.O. Box 738,
Sweetwater, Tex. 79556
Filed Sept. 7, 1965, Ser. No. 485,247
5 Claims. (Cl. 235—61)

The present invention generally relates to a device for averaging a series of students' grades resulting from a test or the like or any series of numbers to enable a grade average for a particular group of students to be quickly and easily determined.

An object of the present invention is to provide a grade averaging device incorporating a novel arrangement of sets of gears orientated in such a manner that the mathematical computation necessary to averaging will be automatically accomplished by the gear arrangement.

Another object of the present invention is to provide a grade averager which will average any number of grades depending upon the particular structural arrangement with the device illustrated being capable of averaging up to thirty grades which will be adequate for most classrooms since most classes will have less than thirty students. The principles of operation could be incorporated into structures for averaging a larger or lesser number of grades.

Another object of the present invention is to provide a grade averager having a dial type input structure and a dial type output for reading the average of the grades put into the device together with an indicator for indicating the number of grades being averaged all of which cooperate with the gear type computation structure for rendering the device operable and readily usable and readable.

Another object of the present invention is to provide a grade averaging device which is relatively simple in construction, dependable in operation and relatively inexpensive to manufacture thus rendering the device economically feasible for use by school systems or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a sectional view taken substantially upon a plane passing along section line 2—2 of FIGURE 3 illustrating the structural details of the gear arrangements;

FIGURE 6 is a detailed sectional view taken substantially upon a plane passing along section line 6—6 of FIGURE 2 illustrating further structural details of the mechanism;

FIGURE 7 is a detailed sectional view of the gear assembly illustrating the meshing relationships thereof;

FIGURE 8 is a detailed sectional view taken along section line 8—8 of FIGURE 2 illustrating the knob mechanism at the input of the device;

Figure 1:
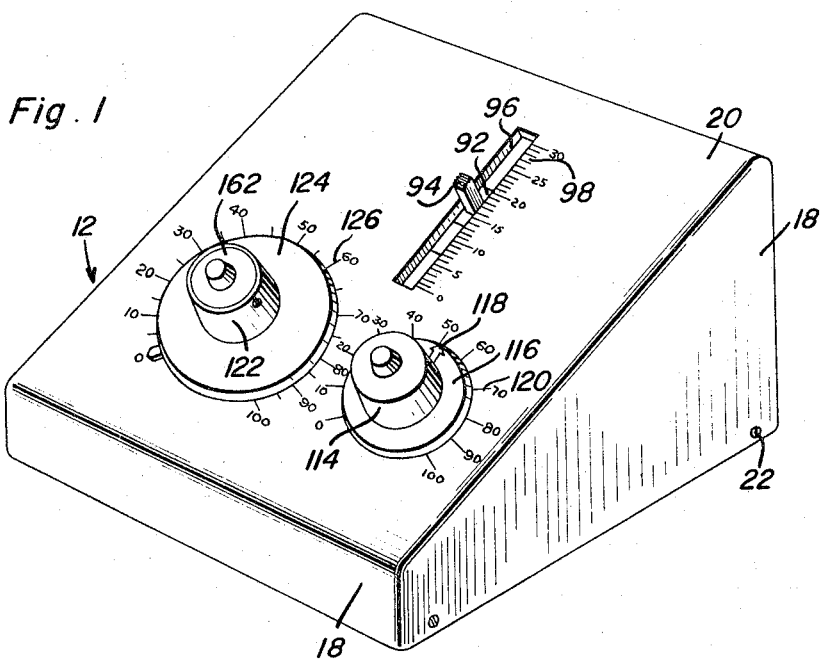
FIGURE 1 is a perspective view of the grade averaging device of the present invention.
Figure 4:
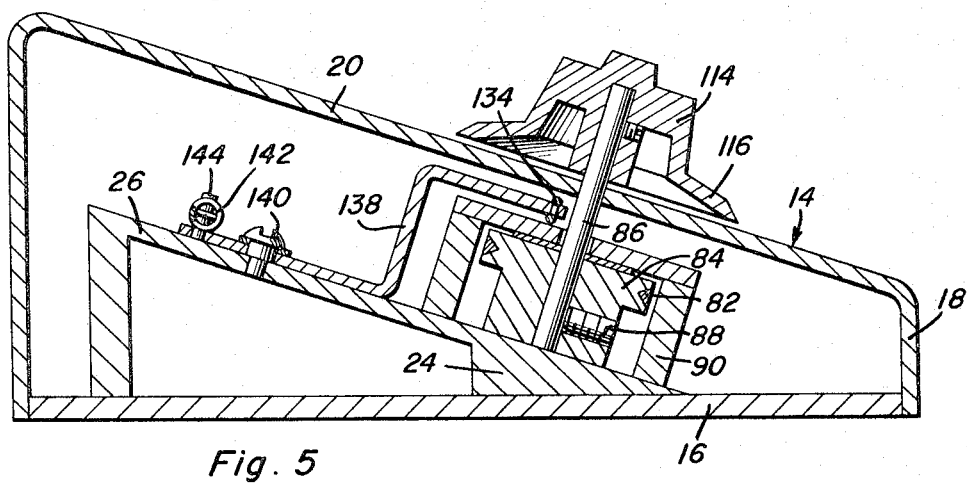
FIGURE 4 is a transverse sectional view taken substantially upon a plane passing along section line 4—4 of FIGURE 3 illustrating the structure for indicating the average grade.

Referring now specifically to the drawings, the grade averaging device of the present invention is generally designated by the numeral 12 and includes a hollow housing structure 14 incorporating in its construction a base plate 16, upstanding peripheral wall members 18 and an inclined top wall 20. The inclined top wall 20 facilitates the observation and use of the device and the housing may take any suitable construction or configuration. Preferably, the base plate 16 is separable from the peripheral walls 18 and secured thereto by suitable fasteners 22 or the like. Of course, the back wall 18 is longer than the front wall 18 so that the top wall 20 will be integral with the peripheral wall but inclined.

Mounted on the base plate 16 either as an integral part thereof or attached thereto is a supporting member 24 which also has an inclined top wall 26 spaced from but generally parallel to the top wall 20. This portion of the construction may vary considerably and may be constructed of metal, plastic or any other suitable material. The base plate 16 may be provided with cushioning feet, a soft covering or any other means for retaining the device in position on a desk, table or other working area.

Upstanding from the top member 26 is a pair of supporting brackets 28 each having an aperture 30 therethrough rotatably receiving an elongated shaft 32. The upper end of the shaft 32 is provided with a collar 34 mounted thereon by a setscrew 36 or the like and the collar 34 engages one of the brackets 28. The other end of the shaft 32 is provided with a collar 38 secured thereon by a similar setscrew and having a bevel gear 40 fixed thereto. The shaft 32 has an elongated key 42 received in a longitudinal groove therein which keys one set of gears 46 to shaft 32. Additional sets of gears 48 and 50 are rotatable on the shaft 32 with the gears in each set being keyed together. Each set of gears has a larger gear at the lower end of the set and a progressively smaller gear disposed adjacent thereto.

Figure 5:
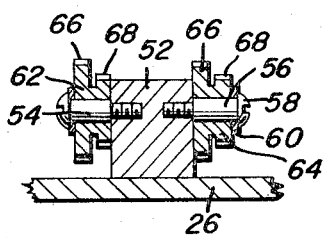
FIGURE 5 is a detailed sectional view taken along section line 5—5 of FIGURE 3 illustrating the gear mechanism.
Figure 3:
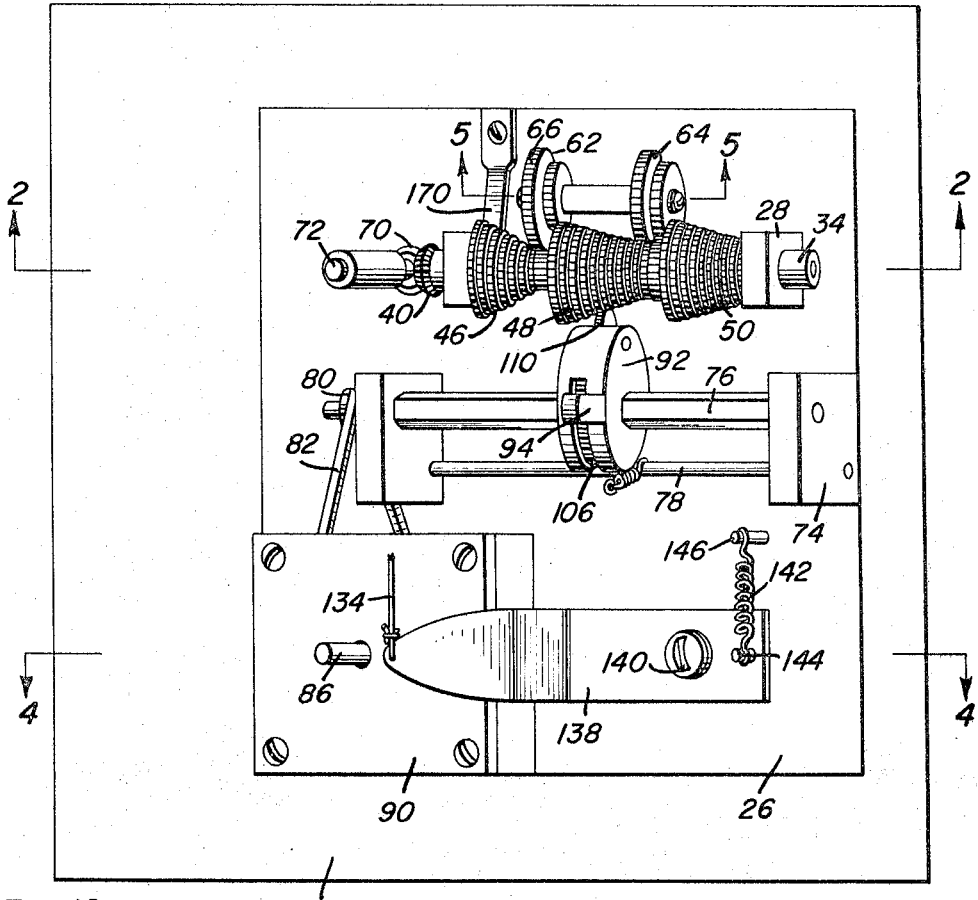
FIGURE 3 is a plan view of the structure with the housing cover removed.
Figure 10:
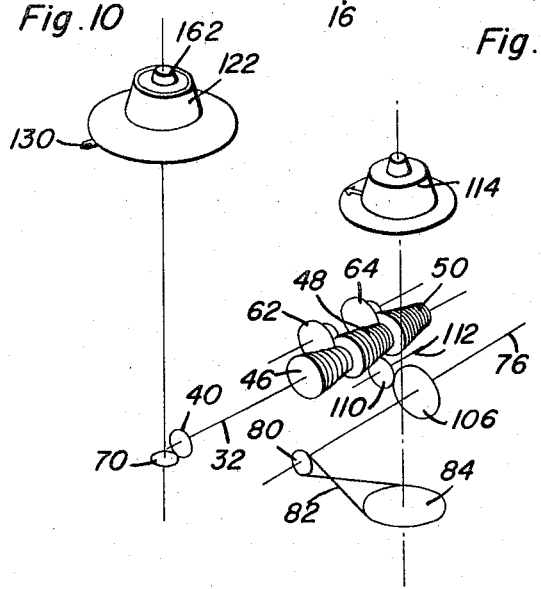
FIGURE 10 is an exploded schematic perspective view illustrating the orientation of the components of the invention.

Disposed along one side of the gears is a supporting block 52 having a pair of stub shafts 54 and 56 respectively extending from the top and bottom edges thereof and being screw threaded into the block 52 and having a headed end 58 provided with a washer 60 for rotatably journaling reduction gear assemblies 62 and 64 thereon which are rotatable independently of each other and each of which includes a larger gear 66 meshed with one set of gears and a small gear 68 meshed with another set of gears. The gears 66 and 68 are integral with each other as illustrated in FIGURE 5. The ratio between the larger gear 66 and the small gear 68 is different on the gear assembly 62 as compared with the gear assembly 64 as illustrated in FIGURE 5.

The gear 40 is in meshing engagement with a gear 70 affixed to an input shaft 72 that extends up through the top wall 20 so that a plurality of grades may be put into the device by rotating the shaft 72 in a manner described hereinafter.

Disposed to the other side of the shaft 32 as compared with the supporting block 52 is a pair of supporting brackets 74 rigid with the top member 26 and rotatably supporting a polygonal shaft 76 therebetween and stationarily supporting a rod 78 spaced therefrom. One end of the shaft 76 is provided with a drive pulley 80 for receiving a segmented drive belt 82 which also encircles a larger pulley 84 fixed to an output shaft 86 which extends up to the top wall 20. The pulley 84 is secured to the shaft 86 by a setscrew 88 or the like and the entire assembly is retained in place by a supporting housing or bracket structure 90. Thus, rotational movement of the polygonal shaft 76 will be transmitted to the output shaft 86 through a reduction by virtue of the pulley 80 being smaller than the pulley 84.

Slidably mounted on the shaft 76 is a housing 92 having an upwardly extending lug or handle 94 rigid therewith which extends upwardly through an elongated slot 96 in the top wall 20. The slot 96 has a graduated scale 98 along one edge thereof to indicate the number of grades or numbers to be put into the device.

Extending laterally from the casing 92 in arcuately spaced relation to the handle lug 94 is an attaching lug or loop 100 having a tension coil spring 102 connected thereto. The other end of the tension coil spring 102 has a loop 104 slidably encircling the rod 78 which interconnects the brackets 74 and which is supported thereby. Thus, at any longitudinal position of the casing 92 on the polygonal shaft 76, the casing 92 will be rotated in a direction and biased in that direction by the spring 102.

Disposed within the casing 92 is an enlarged gear 106 having a polygonal opening 108 slidable on the polygonal shaft 76 so that as the gear 106 is rotated, the shaft 76 will be rotated. In meshing engagement with the gear 106 is a smaller gear 110 journaled on a shaft 112 extending between the walls of the casing adjacent one side thereof so that the gear 110 has the periphery thereof extending beyond the casing 92. The gear 110 is in constant meshing engagement with the gear 106 and the shaft 112 is eccentric to the shaft 76 and eccentric to the center of rotation or pivotal movement of the casing 92 which corresponds with the center of the shaft 76. Thus, the spring 102 will bias the casing in one direction and by engaging the handle or lug 94 and moving it in opposed relation to the tension of the spring 102, the gear 110 along with the casing 92 may be pivoted in a counterclockwise manner as illustrated in FIGURE 7 about the center of the shaft 76 for disengaging the gear 110 from any of the gears of the assemblies 46, 48 and 50 and thus enabling longitudinal shifting movement of the casing 92 by shifting the handle 94 in the slot 96 thereby enabling the gear 110 to be meshed with any one of the gears in the gear sets 46, 48 and 50. The associational relationship of the gears is illustrated in FIGURE 7 and by shifting the casing 92 when the handle 94 is moved longitudinally in the slot 96, the ratio between the input shaft 72 and the output shaft 86 may be varied depending upon the number of grades to be put into the device through the input shaft 72.

The output shaft 86 has a knob 114 by any suitable set-screw means and the knob 114 has a flange 116 of circular configuration and provided with a pointer 118 thereon in the form of an arrow or the like for association with a graduated scale 120 which will indicate the grade average depending upon the final position of the arrow or indicator 118 in relation to the graduated scale 120. Thus, by direct reading of the scale 120 and the indicating pointer 118, the grade average can be readily determined.

For input of the different grades of the students, the input shaft 72 is provided with an input knob 122 having a circular flange 124 fixed thereto to enable easy grasping thereof. A graduated scale 126 is associated with the knob flange 124 to enable the input shaft 72 to be turned for the input of a plurality of grades.

Figure 9:
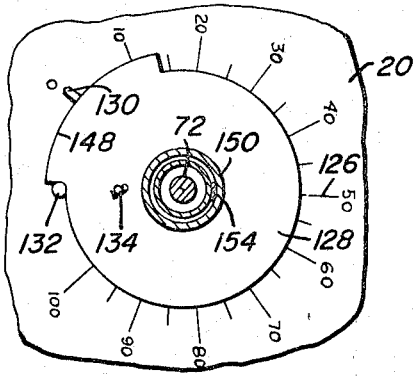
FIGURE 9 is a detailed sectional view taken along section line 9—9 of FIGURE 2 illustrating further structural details of the input knob.

In order for the input knob 122 to return to a zero position after each grade input, a mechanism is provided for enabling a disconnection between the shaft 72 and the actual input indicating plate 128 which underlies the flange 124 and has a pointer 130 thereon. An upstanding pin or peg 132 limits the movement of the pointer in one direction so that it will be aligned with the zero reading of the graduated scale 126 when it is disconnected from the knob structure 122. For returning the indicator plate 128 to the zero position, a flexible cord or wire 134 is provided which extends down through a guide sleeve 136 and extends laterally and is connected to one end of a pivotal arm 138 supported by a pivot pin 140. A tension spring 142 interconnects a peg 144 on the arm 138 and a stationary peg 146 on the top member 26 thus biasing the arm 138 in a direction to retain tension on the flexible cord or wire 134. The end of the cord or wire 134 is anchored to the plate 128 as illustrated in FIGURE 9 and the stop pin or peg 132 engages one side of a projection 148 on the plate 128 which has the indicating pointer 130 thereon as also illustrated in FIGURE 9. The plate 128 is mounted on a cylindrical member 150 having a flange 152 on the bottom thereof underlying the inner edge of the plate 128. A coil compression spring 154 is received in a bottom opening groove in the cylindrical member 150 for biasing the cylindrical member upwardly thus engaging the flange 152 with the plate 128 thereby drivingly interconnecting the plate 128 and the cylindrical member 150. Disposed interiorly of the cylindrical member 150 is a depending cylindrical flange 156 on the knob 122. The knob 122 along with the flange 156 has openings 158 receiving a pair of diametrically opposed slidable pins 160. The upper ends of the pins are received in a push knob 162 received in a recess in the upper end of the knob 120. The knob 162 is normally spaced from the bottom of the recess 164 provided therefor so that upon thumb pressure being exerted on the knob 162, the pins 160 will be moved inwardly in their apertures 158 and corresponding grooves which extend down alongside of the flange 156. The upper end of the sleeve 150 is provided with an annular ring 166 which is keyed to and receive the lower ends of the pins 160 to rotate the cylindrical member 150 when the knob 122 is rotated. When no pressure is exerted on the pressed knob 162, the cylindrical member 150 will be connected with the plate 128 thus rotating the plate and moving the indicator 130 and at the same time biasing the spring 142. After the input of a grade has been made, the knob 162 is pressed thus releasing plate 128 and enabling the spring 142 to return the pointer 132 to its zero position. A frictional connection may be provided between the flange 152 and the plate 128 or a serrated releasable clutch type connection may be employed.

A spring device such as a leaf spring 170 is attached to the top member or wall 26 for retaining the mechanism in adjusted position and to prevent free idling movement thereof thus enabling the device to be moved about without disturbing the operation thereof and without disturbing some grades which may have already been put into the device.

In operation, the handle 94 is moved in such a manner to disengage the gear 110 from the serrated disk or gears. Then, the handle is moved so that it is aligned with the graduated scale to indicate the number of grades to be averaged. When the number of grades to be averaged have been selected, the operator is then ready to proceed with the input of the grades. The input dial or knob 122 is turned clockwise to indicate the desired number or grade on the graduated scale 126. Then, the release button or knob 162 is depressed to enable the indicator 130 on the plate 128 to return to the zero position. The button 162 is then released and the second grade or number is entered in the same manner and this procedure is repeated until all of the grades or numbers have been added into the device. When the number of grades have been entered corresponding with the predetermined number set on the indicating scale 98, the average of the grades will be shown by the averaging dial or knob 114 and the pointer thereon. To average a new set of grades, it is only necessary to return the averaging dial or knob to zero and then set the selector handle to the number of grades to be averaged.

The gear ratios are so arranged that when the handle 94 is adjusted to the lower end of the slot 96, the least number of grades will be averaged, for example, five grades. When the number of grades to be averaged increases, the transmission of power will proceed from the gears 46 into the reduction gear assembly 62 and thus be transmitted onto the second set of gears 48 with a reduction between the gear assemblies 46 and 48 through the gear assembly 62. Then, the gear 110 is selectively engaged with the gears 48 until a large number of grades is to be averaged and when this occurs, then the power is transmitted through the gear assembly 46, reduction gear assembly 62, gear assembly 48, reduction gear assembly 64 and then into the final gear assembly 50. This provides a cumulative reduction ratio thereby enabling a progressive number of grades to be averaged by the gear systems.

Thus, while all of the gears rotate at the same time, only the gear assembly 46 is keyed to the shaft 32 with the gears of the gear assembly 48 being keyed to each other and the gears of the gear assembly 50 being keyed to each other for rotation in relation to the shaft. The meshing interconnection of the gear assemblies 46 and 48 by the reduction gear assembly 62 and the meshing interrelation between the gear assemblies 48 and 50 by the reduction gear assemblies 64 provides a driving interconnection in a series relationship between the gear assemblies 46, 58 and 50.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. A device for averaging a plurality of numerical grades comprising an input means, an output means, a cumulative averaging gear assembly interconnecting the input means and output means, said averaging assembly including a movable indicator for indicating the number of grades to be put into the device and adjusting the assembly to provide the necessary gear ratio for directly indicating the average grade, said gear assembly including a plurality of sets of gears with the sets being rotatable in relation to each other and one of said sets being fixed to a shaft driven from the input means, reduction gear assemblies interconnecting said sets of gears for rotating one in relation to the other, and a reduction gear assembly meshingly engageable with selective gears of a selective set for providing an adjustable cumulative reduction ratio.

2. A grade averaging device comprising a housing, an input dial mounted on said housing and including an input shaft, an average indicating dial mounted on said housing and including an output shaft, an averaging gear assembly interconnecting said input and output shafts, a manually adjustable handle operatively connected with said assembly for varying the ratio of the output shaft rotational speed in relation to the input shaft, said gear assembly including a plurality of sets of gears, each set including a plurality of gears, means driving one set of gears from the input shaft, gear reduction means drivingly connecting a second set of said gears with said one set of gears, a movable output gear means operatively connected to said handle and selectively meshed with one gear of the sets of gears, and means drivingly interconnecting the output gear and output shaft.

3. A mechanical averaging device including a movable value input member, a movable average indicating member, a variable ratio drive connection drivingly connecting said input member to said average indicating member for progressive proportional advancing movement of the latter in response to successive advancing movement of said input member, said drive connection including means operative to selectively vary the drive ratio thereof according to the number of input values to be averaged at one time whereby a direct reading of the total movement of said indicating member will be indicative of the average movement of the input member.

4. A grade averaging device comprising a support, input and output shafts journaled from said support, a variable ratio gear drive connection drivingly connecting said input shaft to said output shaft, means operative to vary the driving ratio of said connection according to the number of input values to be averaged at one time whereby the total rotational movement of said output shaft will be indicative of the average input rotation of the input shaft.

5. The combination of claim 4 including an oscillatable input member and a drive connection between said input member and said input shaft operable to intermittently advance said input shaft in response to oscillation of said input member.

References Cited by the Examiner

UNITED STATES PATENTS

| | | | |
|---|---|---|---|
| 1,460,101 | 6/1923 | Veck | 235—111 X |
| 2,625,325 | 1/1953 | Crenshaw | 235—61 |
| 2,656,100 | 10/1953 | Mundell | 235—61 |
| 3,002,683 | 10/1961 | Rowland | 235—83 |
| 3,158,737 | 11/1964 | Tarpinian | 235—61 |

RICHARD B. WILKINSON, *Primary Examiner.*

WAYNE F. BAUER, *Assistant Examiner.*